United States Patent [19]
Dimroth et al.

[11] 4,206,113
[45] Jun. 3, 1980

[54] AZO DYES HAVING AN OXDIAZOLYL-1,2,4 GROUP

[75] Inventors: Peter Dimroth, Mannheim; Walter Kurtz, Bad Duerkheim; Volker Radtke, Hassloch; Werner Juenemann, Ludwigshafen, all of Fed. Rep. of Germany

[73] Assignee: BASF Aktiengesellschaft, Fed. Rep. of Germany

[21] Appl. No.: 903,231

[22] Filed: May 5, 1978

Related U.S. Application Data

[60] Continuation-in-part of Ser. No. 869,673, Jan. 16, 1978, abandoned, which is a division of Ser. No. 772,768, Feb. 28, 1977, Pat. No. 4,083,686.

[30] Foreign Application Priority Data

Mar. 18, 1976 [AT] Austria .................... 2024/76

[51] Int. Cl.² .............. C09B 29/32; D06P 1/04; D06P 1/44; D06P 1/642
[52] U.S. Cl. .................... 260/157; 106/288 Q; 106/300; 106/308 Q; 106/311; 260/562 K; 548/131
[58] Field of Search ........................ 260/157

[56] References Cited
U.S. PATENT DOCUMENTS 2,901,473  8/1959  Steinemann .................... 260/157 X

FOREIGN PATENT DOCUMENTS 2432838  1/1976  Fed. Rep. of Germany .......... 260/157

Primary Examiner—Floyd D. Higel
Attorney, Agent, or Firm—Keil & Witherspoon

[57] ABSTRACT

Dyes of the formula I

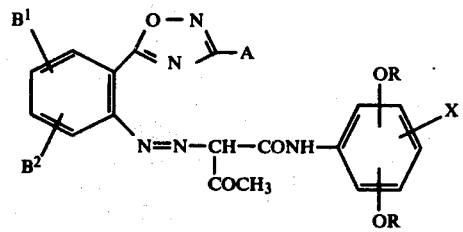

in which A is phenyl or phenyl substituted by chloro, bromo, nitro, methyl, ethyl, methoxy or ethoxy; $B^1$ is hydrogen, chloro, bromo, nitro, methyl or trifluoromethyl; $B^2$ is hydrogen, chloro, bromo or nitro; R is $C_1$ to $C_4$ alkyl; and X is hydrogen, chloro or bromo. The compounds are distinguished by high color strength, brilliance and good fastness properties such as light-fastness, fastness to overspraying, plasticizers fastness and insolubility in most solvents used in connection with pigments. They are particularly suitable for the coloring of air-drying surface coatings, rigid polyvinyl chloride and emulsion paints.

3 Claims, No Drawings

AZO DYES HAVING AN OXDIAZOLYL-1,2,4 GROUP

This application is a continuation in part of our copending application Ser. No. 869,673 filed Jan. 16, 1978, now abandoned which in turn is a divisional application of our copending application Ser. No. 772,768 filed Feb. 28, 1977, now U.S. Pat. No. 4,083,686.

The invention relates to dyes of the formula I

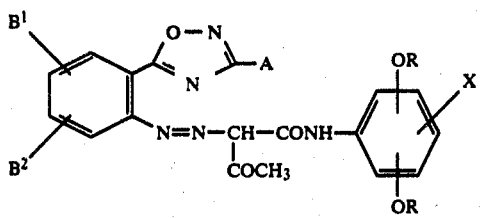

in which
A is phenyl or phenyl substituted by chloro, bromo, nitro, methyl, ethyl, methoxy or ethoxy,
$B^1$ is hydrogen, chloro, bromo, nitro, methyl or trifluoromethyl,
$B^2$ is hydrogen, chloro, bromo or nitro,
R is $C_1$ to $C_4$ alkyl and
X is hydrogen, chloro or bromo.

For the manufacture of the dyes of formula I, a diazo compound of an amine of the formula II

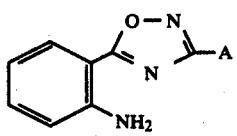

may be reacted with a coupling component of the formula III

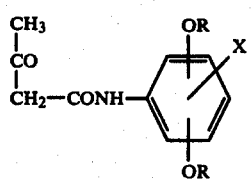

by conventional methods.

Dyes of the formula Ia

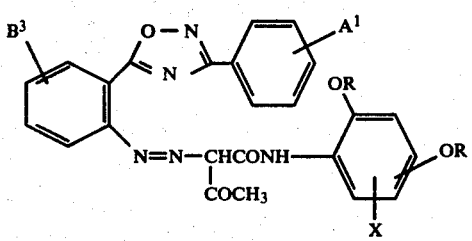

in which
$A^1$ is hydrogen, chlorine or methyl,
$B^3$ is hydrogen, chlorine or nitro,
R is methyl or ethyl and
X is hydrogen or chlorine, are of particular value as pigments.

The compounds of formula I are distinguished by high color strength, brilliance and good fastness properties such as light-fastness, fastness to overspraying, plasticizers fastness and insolubility in most solvents used in connection with pigments. They are particularly suitable for the coloring of air-drying surface coatings, rigid polyvinyl chloride and emulsion paints.

In the Examples which follow, parts and percentages are by weight, unless otherwise stated.

EXAMPLE 1

5.7 parts of 2-(3-phenyloxdiazolyl-1,2,4)-aniline are dissolved in 11 parts of dimethyl formamide and the solution is run into a mixture of 60 parts of ice, 50 parts of water, 10.8 parts of concentrated hydrochloric acid and 12 parts of glacial acetic acid while stirring well. 9 parts of 23% strength $NaNO_2$ solution are slowly added to the resulting suspension at 0° to 5° C. By adding 0.7 part of amido-sulfonic acid the excess nitrite is destroyed.

5.8 parts of 2,4-dimethoxyacetoacetanilide are dissolved in 60 parts of water with 2.6 parts of caustic soda and, after addition of 25 parts of ice, are precipitated again with 8 parts of 50% strength acetic acid. The resulting suspension is run into the diazonium salt solution described above, and the pH of the mixture is adjusted to about 4 with 50% strength caustic soda solution. Stirring is continued for another 30 minutes, filtration is carried out, and the residue is washed with water and dried at 80° C. in vacuo. There is obtained 11.2 parts of a brilliant yellow dye of the formula

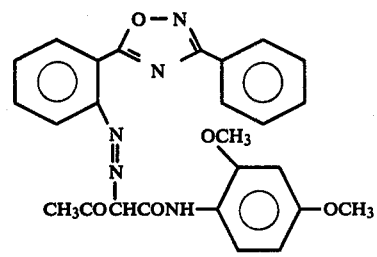

which has excellent light fastness and fastness to weathering in surface coatings.

EXAMPLE 2

27 parts of 4-chloro-2-(3-phenyloxdiazolyl-1,2,4)-aniline are introduced into 100 parts of concentrated sulfuric acid at 20° C., cooled to 0° C. and diazotized by adding 32 parts of nitrosylsulfuric acid. The whole is stirred at 5° C. for 3 hours, the resulting viscous diazonium salt solution is poured onto 600 parts of ice in 200 parts of water, and then 2 parts of amidosulfonic acid are added.

24 parts of 2,4-dimethoxyacetoacetanilide are dissolved in 300 parts of water with 13 parts of caustic soda and, after addition of 120 parts of ice, are precipitated again with 40 parts of 50% strength acetic acid. The suspension obtained is run into the diazonium salt suspension described above, and the pH of the mixture is adjusted to 4 by means of caustic soda solution. Stirring is continued for another 30 minutes, filtration is carried out, and the residue is washed with water and dried at 80° C. in vacuo.

There is obtained 52 parts of a brilliant yellow pigment of the formula

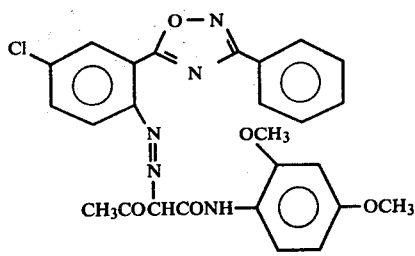

which has excellent light fastness and fastness to weathering.

Following the procedure of Example 1, yellow pigment dyes are obtained using the diazo and coupling components indicated in the Table below:

| Example No. | Diazo component | Coupling component |
|---|---|---|
| 3 | [2-amino-5-(3-phenyl-1,2,4-oxadiazol-5-yl)phenyl] | CH$_3$COCH$_2$CONH–[2-OCH$_3$, 4-Cl, 5-OCH$_3$ phenyl] |
| 4 | " | CH$_3$COCH$_2$CONH–[2-OCH$_3$, 4-OCH$_3$, 5-Cl phenyl] |
| 5 | [4-Cl-2-amino-phenyl-(3-phenyl-1,2,4-oxadiazol-5-yl)] | CH$_3$COCH$_2$CONH–[2-OCH$_3$, 4-OCH$_3$ phenyl] |
| 6 | " | CH$_3$COCH$_2$CONH–[2-OCH$_3$, 4-Cl, 5-OCH$_3$ phenyl] |
| 7 | [5-NO$_2$-2-amino-phenyl-(3-phenyl-1,2,4-oxadiazol-5-yl)] | CH$_3$COCH$_2$CONH–[2-OCH$_3$, 4-OCH$_3$ phenyl] |
| 8 | " | CH$_3$COCH$_2$CONH–[2-OCH$_3$, 4-OCH$_3$, 5-Cl phenyl] |
| 9 | [5-Br-2-amino-phenyl-(3-phenyl-1,2,4-oxadiazol-5-yl)] | CH$_3$COCH$_2$CONH–[2-OCH$_3$, 4-OCH$_3$ phenyl] |
| 10 | [3,5-diCl-2-amino-phenyl-(3-phenyl-1,2,4-oxadiazol-5-yl)] | " |

-continued
| Example No. | Diazo component | Coupling component |
|---|---|---|
| 11 | " | 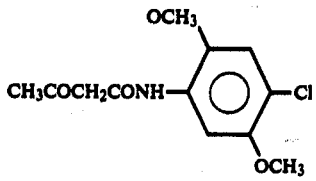 |
| 12 | 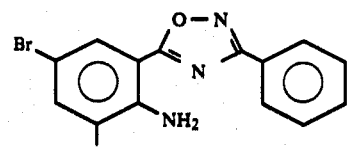 | 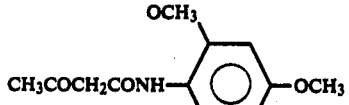 |
| 13 | 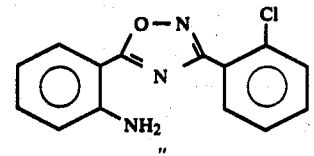 | " |
| 14 | " | 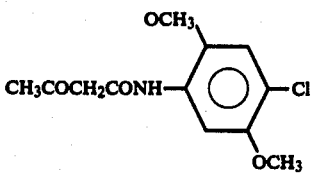 |
| 15 | 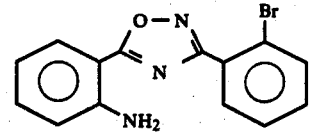 | 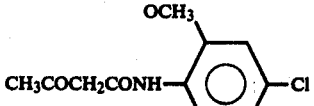 |
| 16 | " | 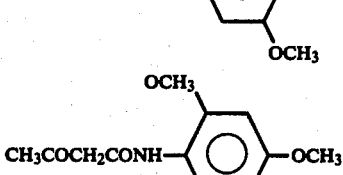 |
| 17 | 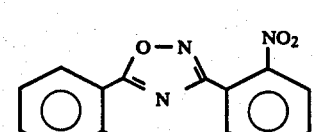 | " |
| 18 | 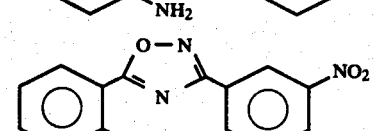 | " |
| 19 | 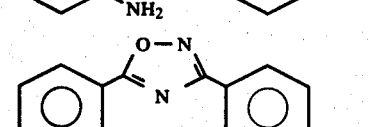 | " |
| 20 | " | 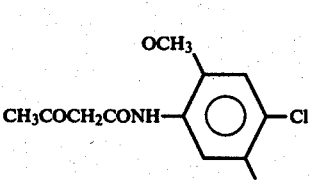 |
| 21 | 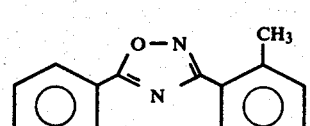 | " |

-continued
| Example No. | Diazo component | Coupling component |
|---|---|---|
| 22 | " | 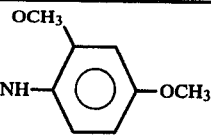 |
| 23 | 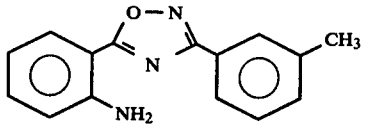 | " |
| 24 | 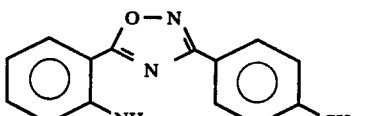 | " |
| 25 | " | 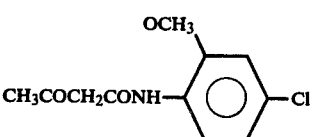 |
| 26 | " | 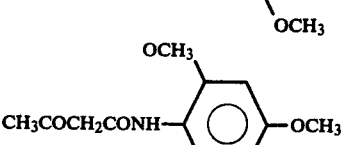 |
| 27 | 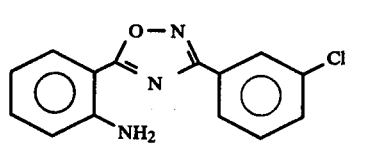 | 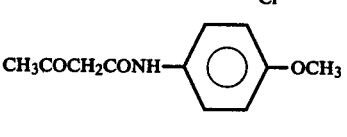 |
| 28 | 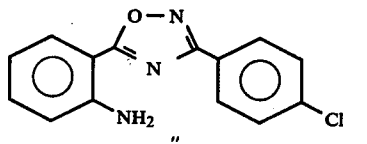 | " |
| 29 | " | 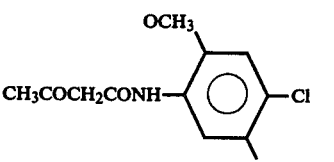 |
| 30 | 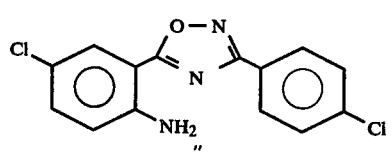 | " |
| 31 | " | 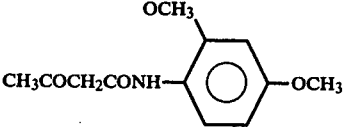 |
| 32 | 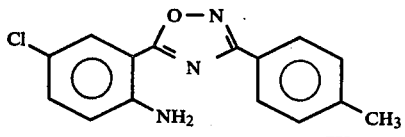 | " |
| 33 | 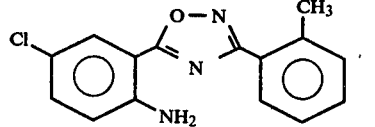 | " |

| Example No. | Diazo component | Coupling component |
|---|---|---|
| 34 | 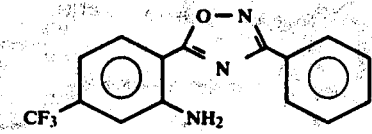 | " |
| 35 | 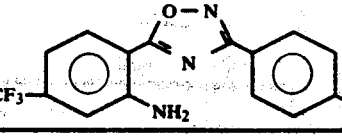 | " |
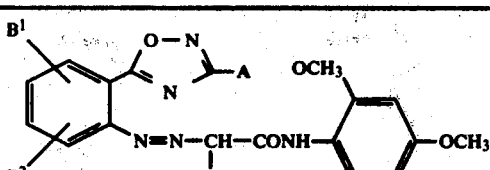
| Example No. | B¹ | B² | A |
|---|---|---|---|
| 36 | 4-Cl | 6-Cl | $C_6H_5$ |
| 37 | " | " | 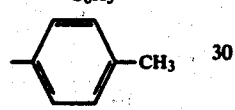 (—C₆H₄—CH₃) |
| 38 | " | " | 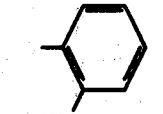 (2-CH₃-C₆H₄) |
| 39 | " | " |  (4-Cl-C₆H₄) |
| 40 | " | " | 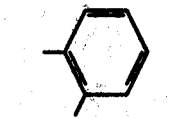 (2-Cl-C₆H₄) |
| 41 | " | " |  (3-Cl-C₆H₄) |
| 42 | " | " | 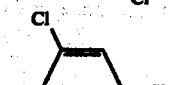 (2,4-Cl₂-C₆H₃) |
| 43 | " | " |  (—C₆H₄—Br) |
| 44 | " | " |  (—C₆H₄—NO₂) |
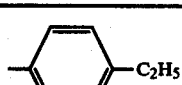
| Example No. | B¹ | B² | A |
|---|---|---|---|
| 45 | " | " | 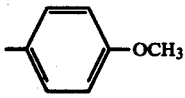 (—C₆H₄—C₂H₅) |
| 46 | 4-Cl | 6-Cl | 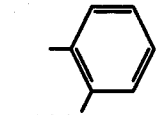 (—C₆H₄—OCH₃) |
| 47 | " | " | 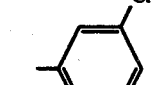 (2-OCH₃-C₆H₄) |
| 48 | " | " | 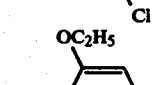 (3,5-Cl₂-C₆H₃) |
| 49 | 4-Cl | 6-Cl | 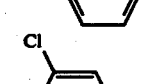 (2-OC₂H₅-C₆H₄) |
| 50 | 4-Cl | 6-Cl | 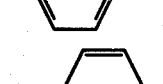 (2-Cl-4-CH₃-C₆H₃) |
| 51 | 4-Br | 6-Br | $C_6H_5$ |
| 52 | " | " |  (—C₆H₄—CH₃) |

-continued

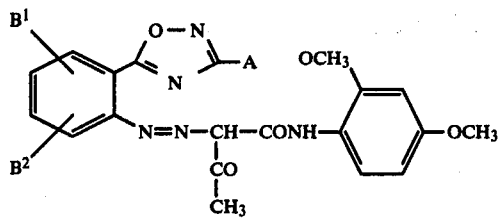

| Example No. | B¹ | B² | A |
|---|---|---|---|
| 53 | " | " | —⌬—OCH₃ |
| 54 | " | " | —⌬—Cl |
| 55 | " | " | o-Cl-C₆H₄— |
| 56 | " | " | —⌬—Br |
| 57 | 4-NO₂ | H | 2,4-di-Cl-C₆H₃— |
| 58 | " | H | —⌬—Cl |
| 59 | " | H | —⌬—CH₃ |
| 60 | " | H | —⌬—OCH₃ |
| 61 | " | 6-NO₂ | C₆H₅ |
| 62 | " | " | o-CH₃-C₆H₄— |
| 63 | 4-Cl | 6-Cl | —⌬—OC₂H₅ |
| 64 | 4-NO₂ | 6-NO₂ | —⌬—Cl |
| 65 | " | " | —⌬—OCH₃ |
| 66 | 4-Cl | 6-NO₂ | C₆H₅ |

-continued

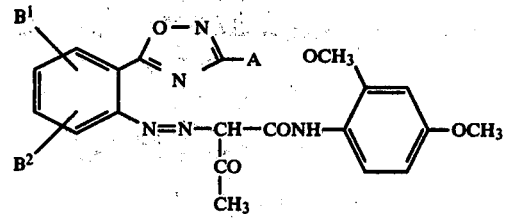

| Example No. | B¹ | B² | A |
|---|---|---|---|
| 67 | " | " | —⌬—Cl |
| 68 | 4-CF₃ | H | C₆H₅ |
| 69 | 4-CF₃ | | —⌬—CH₃ |
| 70 | 4-CF₃ | H | o-CH₃-C₆H₄— |
| 71 | " | H | —⌬—Cl |
| 72 | " | H | o-Cl-C₆H₄— |
| 73 | " | H | m-Cl-C₆H₄— |
| 74 | 5-NO₂ | H | C₆H₅ |
| 75 | " | H | —⌬—Cl |
| 76 | H | H | m-Cl-C₆H₄— |

Use

EXAMPLE 1

20 parts of the dye obtained according to Example 1 are triturated with 5 parts of a condensation product of nonylphenol with 10 moles of ethylene oxide, 25 parts of ethylene glycol and 25 parts of water in a dispersing apparatus (e.g. Red Devil; 3-mm balls). 2 parts of the mixture thus obtained are incorporated into 98 parts of a commercial polymer emulsion paint. There is obtained a brilliant yellow paint that is light-fast and fast to weathering.

EXAMPLE 2

5 parts of the dye obtained according to Example 1 and 95 parts of an air-drying lacquer mixture (e.g. Alkyldal F 681, 35% strength in white spirit) are treated in an attrition mill. After application and drying, brilliant full-shade coatings are obtained which have very good light-fastness and fastness to weathering.

When adding for example TiO$_2$, brilliant reduced-shade coatings of good color depth are obtained.

EXAMPLE 3

Strong colorations that are fast to weathering are obtained in rigid PVC by incorporating for example 0.05 part of the pigment dye obtained according to Example 1 into 50 parts of a rigid-PVC composition consisting of 98 parts of PVC powder (e.g. ®Vinoflex 531) and 2 parts of a stabilizer. Dyeing is carried out on a heatable roller mill at 140° C. within 8 to 10 minutes.

Reductions are obtained for example by adding 2.5 parts of TiO$_2$ (e.g. RN 56) to 0.25 parts of the dye obtained according to Example 1 and 50 parts of rigid-PVC composition.

Similar results are obtained when using the pigments described in the other Examples.

We claim:

1. A dye of the formula

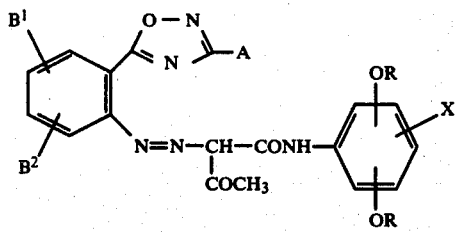

in which

A is phenyl or phenyl substituted by chloro, bromo, nitro, methyl, ethyl, methoxy or ethoxy, B$^1$ is hydrogen, chloro, bromo, nitro, methyl or trifluoromethyl, B$^2$ is hydrogen, chloro, bromo or nitro, R is C$_1$ to C$_4$ alkyl and X is hydrogen, chloro or bromo.

2. A dye according to claim 1 of the formula

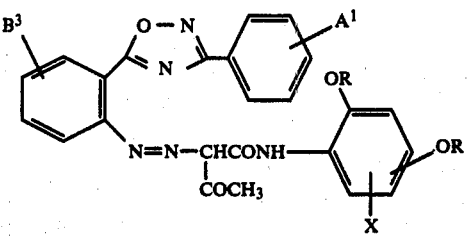

in which

A$^1$ is hydrogen, chlorine or methyl,

B$^3$ is hydrogen, chlorine or nitro,

R is methyl or ethyl and

X is hydrogen or chlorine.

3. The dye according to claim 1 of the formula

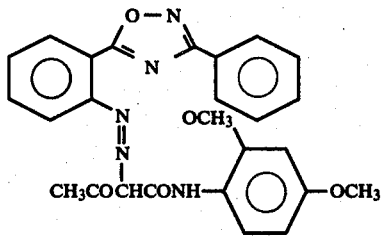

* * * * *